United States Patent [19]
Balczun et al.

[11] Patent Number: 4,733,855
[45] Date of Patent: Mar. 29, 1988

[54] TAPERED RUBBER SPRING UNITS

[75] Inventors: Paul J. Balczun, Erie; James W. Sherrick, Edinboro, both of Pa.

[73] Assignee: Lord Corporation, Erie, Pa.

[21] Appl. No.: 944,092

[22] Filed: Dec. 22, 1986

[51] Int. Cl.$^4$ .......................... F16F 7/00; B60G 11/22
[52] U.S. Cl. .................................. 267/294; 267/141.1; 267/257; 280/716
[58] Field of Search ................. 267/3, 6, 21 R, 21 A, 267/15 R, 15 A, 63 R, 63 A, 136, 152, 153, 151, 141.1, 141.7, 140.4, 257, 294, 228; 280/716, 687, 112 R; 105/198.7, 224.1

[56] References Cited

U.S. PATENT DOCUMENTS

| 336,593 | 2/1886 | Rogers | 267/30 |
| 2,733,059 | 1/1956 | Van Raden | 267/30 |
| 3,606,295 | 9/1971 | Appleton | 267/141.1 X |
| 4,232,754 | 11/1980 | Corrigan et al. | 280/112 R X |
| 4,352,509 | 10/1982 | Paton | 280/716 |

FOREIGN PATENT DOCUMENTS

| 0168930 | 9/1985 | Japan | 267/141.1 |
| 0503341 | 4/1939 | United Kingdom | 267/21 A |

Primary Examiner—Andres Kashnikow
Assistant Examiner—Robert J. Oberleitner
Attorney, Agent, or Firm—Philip P. McCann; James W. Wright

[57] ABSTRACT

This invention relates to spring block elements of the type comprising layers of rubber affixed to end and intermediate plates, and according to this invention the layers of rubber are uniformly tapered in one direction to reduce buckling effect. Two such spring block elements may be horizontally positioned in a compression spring unit between a stationary beam and corresponding pivot arms which are vertically spaced from the stationary beam.

5 Claims, 3 Drawing Figures

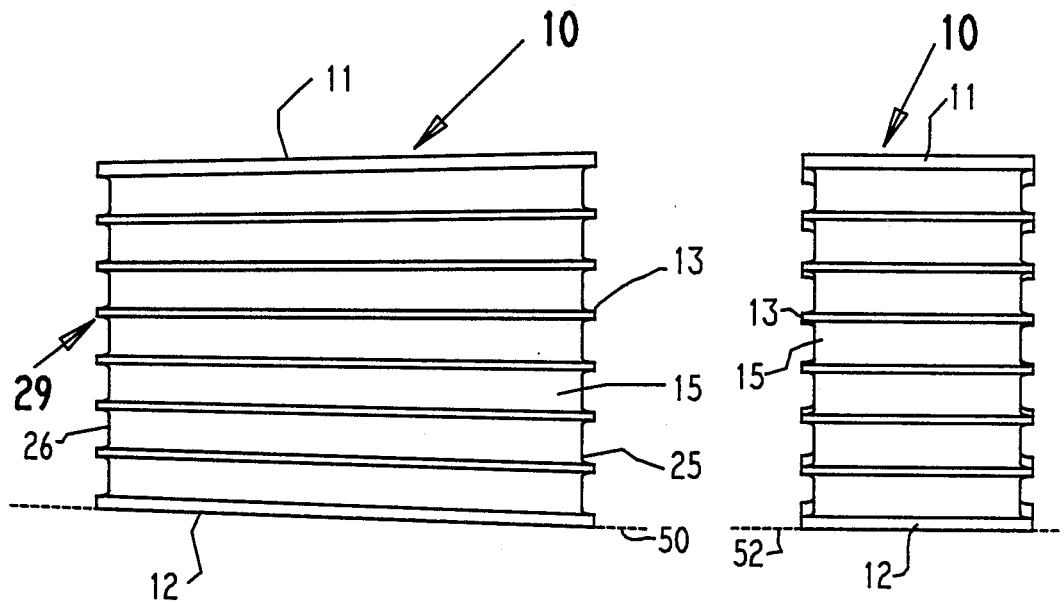
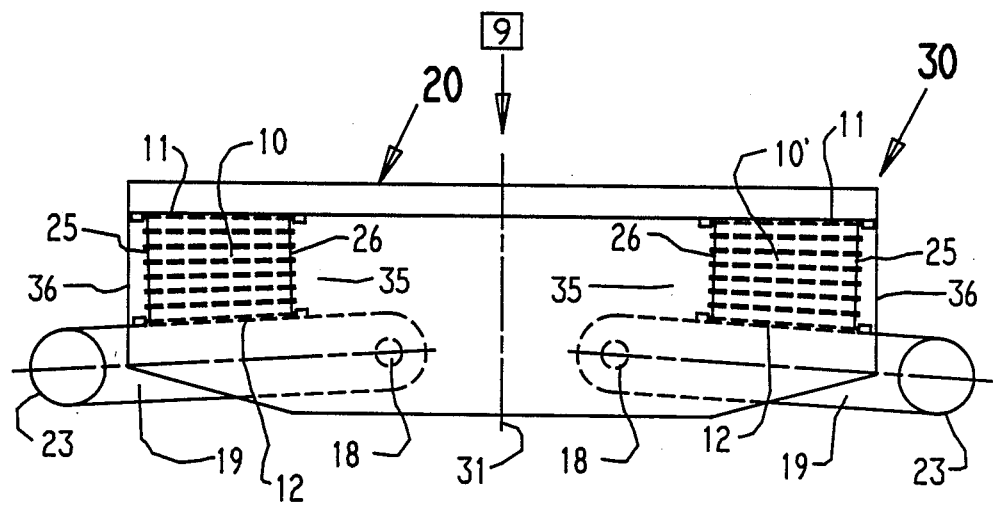

TAPERED RUBBER SPRING UNITS

BACKGROUND OF THE INVENTION

The present invention relates to improvements in rubber compression spring units including spring block elements of the sandwich type comprising layers of rubber bonded to metal end plates and intermediate metal plates, the element forming a resilient block with a laminated structure. The invention relates more particularly to rubber spring units intended for operation chiefly in compression to support a load or a pressure exerted vertically and to work occasionally in shear when, to the main effect of compression, there is added a component directed horizontally and resulting, for example, in a horizontal displacement of the supported load. Such spring units are disclosed, for example, in U.S. Pat. Nos. 3,575,403; 3,471,165; 3,730,509 and 3,504,905.

Spring units of this kind are used, for example, in the suspension of truck bodies wherein the body is supported either directly on the undercarriage chassis (secondary suspension) or on floating bolsters (tertiary suspension). These spring units are placed on each side of the undercarriage chassis wherein each spring unit is between a stationary beam and a pivot arm to form the side bearers for the body on the undercarriage. The pivot arm acts as a reactive force to the load and compresses the spring unit against the stationary beam. In these applications, these rubber spring units have in particular the advantage of preventing the transmission of mechanical and sound vibrations between the undercarriage and the body of the carriage and of reducing, in consequence, the running noises.

When the vertical deflection of the suspension is effected at another part of the suspension, the side bearers are not required to have a large vertical deflection under load but they are required to have a slight stiffness in horizontal shear in the longitudinal direction of the carriage, to allow particularly the rotation of the undercarriage with respect to the body when the truck is moving in a curve, for example. The spring units must also offer a definite resilience in horizontal shear in the transverse direction to allow the displacement and the transverse return of the body with respect to the chassis. This transverse return, in the case of truck bodies, should have a value that is almost constant whatever the load transported by the truck.

It is known that the stiffness in shear of a rubber spring diminishes rather more as the spring is compressed, and that it can even become negative, wherein the spring becomes unstable resulting in buckling. This is a serious drawback to the use of such rubber springs as side bearers of the body when the loading of the body can vary to a high degree between the unladen weight and the full load. In these cases, in fact, it is difficult to produce rubber spring units offering the desired rigidity in shear, not only when the carriage is unladen but also when it is fully loaded or overloaded. In fact, it has been found that in the unladen position of a suspension having a spring unit interposed between a stationary beam and a pivot arm, the inside portion of each spring unit is in compression and the outside portion of each spring unit is in tension.

It has been found that, depending on the length/width ratio and the shear/compression spring rate ratios, buckling of the spring block element will occur at loadings and deflections which typically occurs at about 20% compression deflection. Furthermore, it has been found that in a rubber compression spring unit having two spring block elements, the inboard end of the spring will be compressed to a greater percent of its rubber wall and hence is the point at which buckling occurs. U.S. Pat. No. 3,575,403 discloses a compression spring including spring elements with layers of rubber bonded to intermediate plates characterized in that the compression spring has two spaced spring elements and arranged so that when the spring flexes in compression, the elements tend to approach and rest on each other.

SUMMARY OF THE INVENTION

It is an object of the present invention to provide a spring block element which overcomes the buckling problems of a normal rectangular spring element. It is a further object of the present invention to provide a rubber compression spring unit that offsets the compression loading to reduce buckling of said spring block elements.

The spring block element according to the present invention works principally in compression to support load exerting vertical forces and occasionally in shear under horizontal forces, wherein said spring block element comprises a plurality of layers of rubber affixed to at least two end plates and to at least one intermediate plate wherein the spring block element has a rectangular configuration having a length along a longitudinal axis and a width along a secondary axis perpendicular to said longitudinal axis wherein a horizontal plane is formed by the intersection of said longitudinal axis and secondary axis; said spring block element has a first side and a second side each side being in a vertical plane, perpendicular to said horizontal plane, and each side having a height, wherein said layers of rubber are tapered such that the height of the first side is from about 70 to about 98 percent of the height of said second side.

The present invention further includes a rubber compression spring unit comprising (a) a stationary beam located in a horizontal plane; (b) a pivot arm spaced vertically from said stationary beam; and (c) a spring block element securely interposed to and between said stationary beam and said pivot arm wherein the spring block element comprise a plurality of layers of rubber affixed to end plates and to intermediate plates wherein said spring block has a rectangular configuration having a length along a longitudinal axis and width along a secondary axis perpendicular to said longitudinal axis wherein said longitudinal axis and secondary axis form a horizontal plane; said spring block element has a first side and a second side each side being in a vertical plane perpendicular to said horizontal plane and each side having a height wherein said layers of rubber are tapered along the longitudinal axis such that the height of the first side is from about 70 to about 98 percent of height of said second side; whereby each spring block element works principally in compression to support loads and occassionally in shear under horizontal forces; wherein said spring block elements are spaced horizontally and positioned so that said first side of said block elements are next to each other and second side are located on the outside periphery of said spring unit.

DESCRIPTION OF THE DRAWINGS

Objects in addition to the foregoing will become apparent upon consideration of the following discussion taken in conjunction with the accompanying drawings wherein:

FIG. 1 shows an elevational view of a rubber spring block element according to this invention;

FIG. 2 shows an end view of the rubber spring block element of FIG. 1.; and

FIG. 3 shows an elevational view of a rubber compression spring unit according to this invention.

DETAILED DESCRIPTION OF THE INVENTION

Referring now to the drawings, FIGS. 1, 2 and 3 a rubber compression spring unit 30 comprises two tapered spring block elements 10 having lower and upper metal end plates 11 and 12, fixed respectively on a pivot arm 19 and a stationary beam 20.

A longitudinal axis 50 extends along the length of spring block element 10 and a secondary axis 52 perpendicular to the longitudinal axis 50 extends along the width of the spring block element 10 wherein the longitudinal axis and secondary axis form a horizontal plane. A vertical plane is formed perpendicular to said horizontal plane such that the height of the block element 10 is in the vertical plane. As shown in FIG. 3, the upper plate 11 is located in the horizontal plane formed by the longitudinal axis 50 and secondary axis 52. The stationary beam 20 is located in another horizontal plane which is parallel to the horizontal plane. Furthermore, the plane in which the lower plate 12 is located and which is parallel to the plane of the pivot arm, rotates from about −10 to about 10 degree angle about an imaginary horizontal plane parallel to the horizontal plane.

Each spring block element 10 has a plurality of layers of rubber 15 which in the present embodiment are solid and are made from unvulcanized natural rubber or other suitable unvulcanized rubber, at least two end plates 11, 12 and at least one intermediate plate 13. The end plates 11, 12 are about 0.25 inch thick and the intermediate plates 13 are about 0.125 inch thick. The length and width of the rubber layers is from about 80 to about 95 percent of the corresponding length and width of the steel plates.

Each rubber layer 15 has a thickness of about one inch. The rubber layers 15 are uniformly tapered along the longitudinal axis 50 from a wide end 25 of the spring block element to a narrow end 26 of the spring block element. The dimension of the narrow end 26 of each rubber layer is from about 70 to about 98 percent of the height dimension of the wide end 25, preferably from about 75 to about 90 percent of the height of the wide end. The ratio of length to width of the spring block element 10 is from about 1.5:1 to about 4:1, preferably from about 1.9:1 to about 3:1.

The spring block element 10 is formed by assembling the alternating layers of unvulcanized rubber and steel and placing in a mold for vulcanization at suitable temperature, pressure and time. The vulcanization results in the rubber being cured and bonded to the metal plates. In the embodiment disclosed herein the vulcanization results from a temperature of from about 300° to about 350° F. for a time of from 10 to about 30 minutes at a suitable pressure dependant on press design. The block element may be post cured for an additional 10 to 30 minutes at a temperature from about 275° to about 325° F. A rubber coating 29 is generally formed over the exposed metal plates.

The spring works under compression to support vertically a load 9 such as a truck cab or body. It can, moreover, work occasionally in shear when it is subjected to forces directed horizontally along the longitudinal axis 50 or the secondary axis 52 or component forces thereof.

As shown in FIG. 3, the tapered spring block elements 10, 10' are placed on each side of the rubber compression unit 30 symmetrically about an intermediary vertical plane 31 to support the load 9. The top of each spring unit 10, 10' is secured to a stationary compensator beam 20 by four screws (not shown) and the opposite end of each spring unit 10, 10' is secured by four screws (not shown) to a pivot arm 19 which pivots about the pivot point 18. The axial outer end 23 of each pivot arm 19 is affixed to an axle (not shown) wherein vibrations are transmitted through the pivot arm 19 to each block element 10. As previously stated, each pivot arm pivots about the pivot point 18 from about −10 to about 10 degrees angle on an imaginary horizontal plane parallel to the horizontal plane of the stationary beam. In fact in one embodiment of the present invention when each spring unit is mounted in the rubber compression unit, the pivot arm is at about −6° angle to the stationary beam and each spring unit is attached between the pivot arm and the stationary beam. When the basic load of the truck is applied to the rubber compression unit, the pivot arm is in a plane about parallel to that plane of the stationary beam and when a load is applied, the pivot arm is from 0 to about 10 degree angle of the plane.

The block elements 10, 10' are positioned such that the narrow ends 26 of the rubber layers are on the inboard side 35 and the wide ends 25 of the rubber layers are on the outboard side 36 of the rubber compression unit 30. These rubber compression units positioned as described incur less deflection ranging from about 10% less deflection on the outboard side 36 to about 60% less deflection on the inboard side 35 of each spring unit 10 as compared to a rectangular spring unit not having tapered rubber layers according to this invention.

The rubber compression spring unit 30 must, moreover, offer a good flexibility in the longitudinal direction to allow, for example, the rotation of the undercarriage with respect to the body when the carriage is moving along a curve as well as a definite flexibility in the transverse direction of the body. These movements of rotation and transverse displacements are permitted by the movement of the pivot 19 about a pivot point 18 or of another equivalent system ensuring the transmission of the longitudinal traction and braking effects between the load 9 and the suspension system.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A rubber compression spring unit comprising (a) a stationary beam located in a horizontal plane; (b) a pivot arm vertically spaced from said stationary beam; and (c) at least two non preloaded spring block elements securedly interposed to and between said stationary beam and said pivot arm, each spring block element comprises a plurality of layers of rubber affixed to at least two rigid end plates and to at least one rigid intermediate plate wherein said spring block has a general rectangular configuration having a length along a longitudinal axis and width along a secondary axis perpendicular to said longitudinal axis;

said spring block element has a first side and a second side wherein said layers of rubber are tapered along the longitudinal axis such that said first side is from about 70 to about 98 percent of height of said second side; wherein said block elements are spaced horizontally and positioned so that said first side of said block elements are next to each other and said second side of said block elements are located on the outside periphery of said spring unit.

2. A rubber compression spring unit of claim 1 wherein
   (a) said layers of rubber are tapered such that said first side is from about 75 to about 90 percent of the width of the wide end;
   (b) said layer of rubber comprises natural rubber;
   (c) said end plates and said intermediate plates comprises steel wherein said natural rubber is affixed to said end plates and intermediate plates by vulcanization; and
   (d) said ratio of length to width is from about 1.5:1 to about 4:1.

3. A rubber compression spring unit of claim 2 wherein each spring block element comprises two steel end plates and from 4 to 7 intermediate steel plates.

4. A rubber compression spring unit of claims 1 or 2 wherein said pivot arm pivots from about −10 to about +10 degrees angle of a horizontal plane parallel to the horizontal plane of said stationary beam.

5. A rubber compression spring unit of claim 4 comprising two pivot arms and two spring block elements.

* * * * *